(12) United States Patent
Cmielowski et al.

(10) Patent No.: US 11,699,082 B2
(45) Date of Patent: Jul. 11, 2023

(54) MULTI-DIMENSIONAL RECORD CORRELATIONS

(71) Applicant: International Business Machines Corporation, Armonk, NY (US)

(72) Inventors: Lukasz G. Cmielowski, Cracow (PL); Wojciech Sobala, Cracow (PL); Maksymilian Erazmus, Zasów (PL); Rafal Bigaj, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 658 days.

(21) Appl. No.: 16/691,269

(22) Filed: Nov. 21, 2019

(65) Prior Publication Data

US 2021/0158178 A1    May 27, 2021

(51) Int. Cl.
*G06F 16/00* (2019.01)
*G06N 5/04* (2023.01)
*G06F 16/28* (2019.01)
*G06N 20/00* (2019.01)

(52) U.S. Cl.
CPC ............. *G06N 5/04* (2013.01); *G06F 16/285* (2019.01); *G06N 20/00* (2019.01)

(58) Field of Classification Search
CPC ......... G06N 5/04; G06N 20/00; G06F 16/285
USPC .......................................................... 706/12
See application file for complete search history.

(56) References Cited

U.S. PATENT DOCUMENTS

| 10,282,553 B1 | 5/2019 | Schroeder et al. |
| 2017/0178245 A1 | 6/2017 | Rodkey |

FOREIGN PATENT DOCUMENTS

| CN | 109033104 A | 12/2018 |
| WO | 2019108193 A1 | 6/2019 |

OTHER PUBLICATIONS

Principal component analysis. https://en.wikipedia.org/wiki/Principal_component_analysis <Retrieved Jan. 25, 2023>.

*Primary Examiner* — Alexandria Y Bromell
(74) *Attorney, Agent, or Firm* — Nathan M. Rau

(57) ABSTRACT

A method, system, and computer program product for correlation detection between artificial intelligence (AI) transactions. The method stores a set of transaction records associated with an AI decision engine. Each transaction record has a set of record characteristics. The method assigns the set of transaction records to a set of batches on the set of record characteristics. A set of batch characteristics are determined for a batch of the set of batches. The method determines one or more correlations among the set of batch characteristics. The one or more correlations are compared with one or more threshold batches. The method determines, from the one or more correlations and the comparing, an impact of one or more recommendations of the AI decision engine. The one or more recommendations are defined by the set of transaction records.

20 Claims, 6 Drawing Sheets

MULTI-DIMENSIONAL RECORD CORRELATIONS

BACKGROUND

Many systems use artificial intelligence engines to make specified decisions within production environments. Artificial intelligence systems make decisions in comparison and risk-based situations. Some systems position artificial intelligence engines at a midway point in a decision making process. Artificial intelligence engines may make recommendations and pass those recommendations for final approval authorization. Metrics for monitoring artificial intelligence decisions may differ from other metrics used to evaluate decisions made by the artificial intelligence engines.

SUMMARY

According to an embodiment described herein, a computer-implemented method for correlation detection between AI transactions in an AI monitoring system is provided. The method stores a set of transaction records associated with an AI decision engine. Each transaction record has a set of record characteristics. The set of transaction records are assigned to a set of batches based on the set of record characteristics. The method determines a set of batch characteristics for a batch of the set of batches to which at least a portion of the transaction records are assigned. The method determines one or more correlations among the set of batch characteristics and compares the one or more correlations with one or more threshold batches. The method determines an impact of one or more recommendations of the AI decision engine from the one or more correlations and the comparison to threshold batches. The one or more recommendations are defined by the set of transaction records.

According to an embodiment described herein, a system for correlation detection between AI transactions in an AI monitoring system is provided. The system includes one or more processors and a computer-readable storage medium, coupled to the one or more processors, storing program instructions that, when executed by the one or more processors, cause the one or more processors to perform operations. The operations include storing a set of transaction records associated with an AI decision engine. Each transaction record has a set of record characteristics. The set of transaction records are assigned to a set of batches based on the set of record characteristics. The operations determine a set of batch characteristics for a batch of the set of batches to which at least a portion of the transaction records are assigned. The operations determine one or more correlations among the set of batch characteristics and compares the one or more correlations with one or more threshold batches. The operations determine an impact of one or more recommendations of the AI decision engine from the one or more correlations and the comparison to threshold batches. The one or more recommendations are defined by the set of transaction records.

According to an embodiment described herein a computer program product for correlation detection between AI transactions in an AI monitoring system is provided. The computer program product includes a computer readable storage medium having program instructions embodied therewith, the program instructions being executable by one or more processors to cause the one or more processors to perform operations including storing a set of transaction records associated with an AI decision engine. Each transaction record has a set of record characteristics. The set of transaction records are assigned to a set of batches based on the set of record characteristics. The computer program product determines a set of batch characteristics for a batch of the set of batches to which at least a portion of the transaction records are assigned. The computer program product determines one or more correlations among the set of batch characteristics and compares the one or more correlations with one or more threshold batches. The computer program product determines an impact of one or more recommendations of the AI decision engine from the one or more correlations and the comparison to threshold batches. The one or more recommendations are defined by the set of transaction records.

DETAILED DESCRIPTION

The present disclosure relates generally to methods for multi-dimensional record correlation. More particularly, but not exclusively, embodiments of the present disclosure relate to a computer-implemented method for correlation detection between multidimensional artificial intelligence (AI) transactions in an AI monitoring system. The present disclosure relates further to a related system for multi-dimensional record correlation, and a computer program product for operating such a system.

AI decision engines may be used in a variety of fields, such as health care and financial institutions. AI decision engines may be evaluated using AI metrics. Decisions made by AI decision engines may be evaluated using other metrics, such as business metrics, key performance indicators, income, revenue, return on investment, health outcomes, and other suitable metrics. Data involved in decisions made by AI decision engines may also be used to evaluate those recommendations. Varying metrics and data may be used, by embodiments of the present disclosure, to evaluate decisions of an AI decision engine. For example, a person may seek a loan, providing some information for consideration. The AI decision engine may provide a recommendation based on the information to a controller. The recommendation may generate a transaction record. The recommendation may then be passed to a final approval authority. Data involved in the recommendation and transaction record may be understood as a business payload. A scoring payload or machine learning payload representing metrics by which the AI decision engine reached the recommendation may represent different dimensions or dimensionality than the business payload. Embodiments of the present disclosure enable modification of dimensionality between data and metrics associated with transaction records to enable analysis and evaluation of the AI decision engine.

Some embodiments of the concepts described herein may take the form of a system or a computer program product. For example, a computer program product may store program instructions that, when executed by one or more processors of a computing system, cause the computing system to perform operations described above with respect to the computer implemented method. By way of further example, the system may comprise components, such as processors and computer readable storage media. The computer readable storage media may interact with other components of the system to cause the system to execute program instructions comprising operations of the computer implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Figure 1:
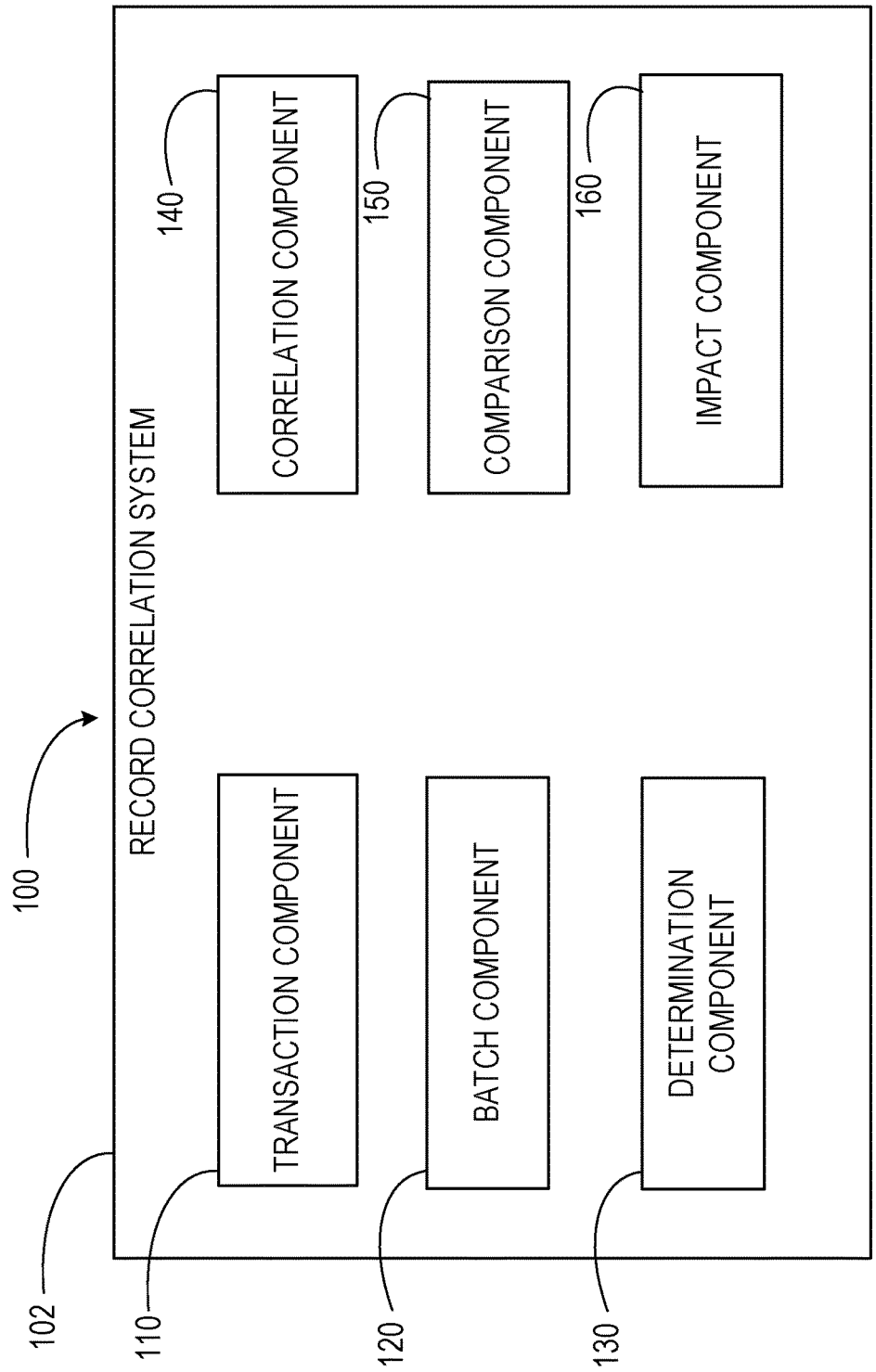
FIG. 1 depicts a block diagram of a computing environment for implementing concepts and computer-based methods, according to at least one embodiment.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include a record correlation system 102. The record correlation system 102 may comprise a transaction component 110, a batch component 120, a determination component 130, a correlation component 140, a comparison component 150, and an impact component 160. The transaction component 110 stores and organizes sets of transaction records associated with an AI decision engine. The batch component 120 assigns transaction records to batches. The determination component 130 determines batch characteristics for a batch including assigned transaction records. The correlation component 140 determines correlations among batch characteristics. The comparison component 150 compares correlations to one or more of threshold batches, predetermined correlations, and previous sets of transaction records. The impact component 160 determines an impact of one or more recommendations of the AI decision engine. Although described with distinct components, it should be understood that, in at least some embodiments, components may be combined or divided, or additional components may be added, without departing from the scope of the present disclosure.

Figure 2:
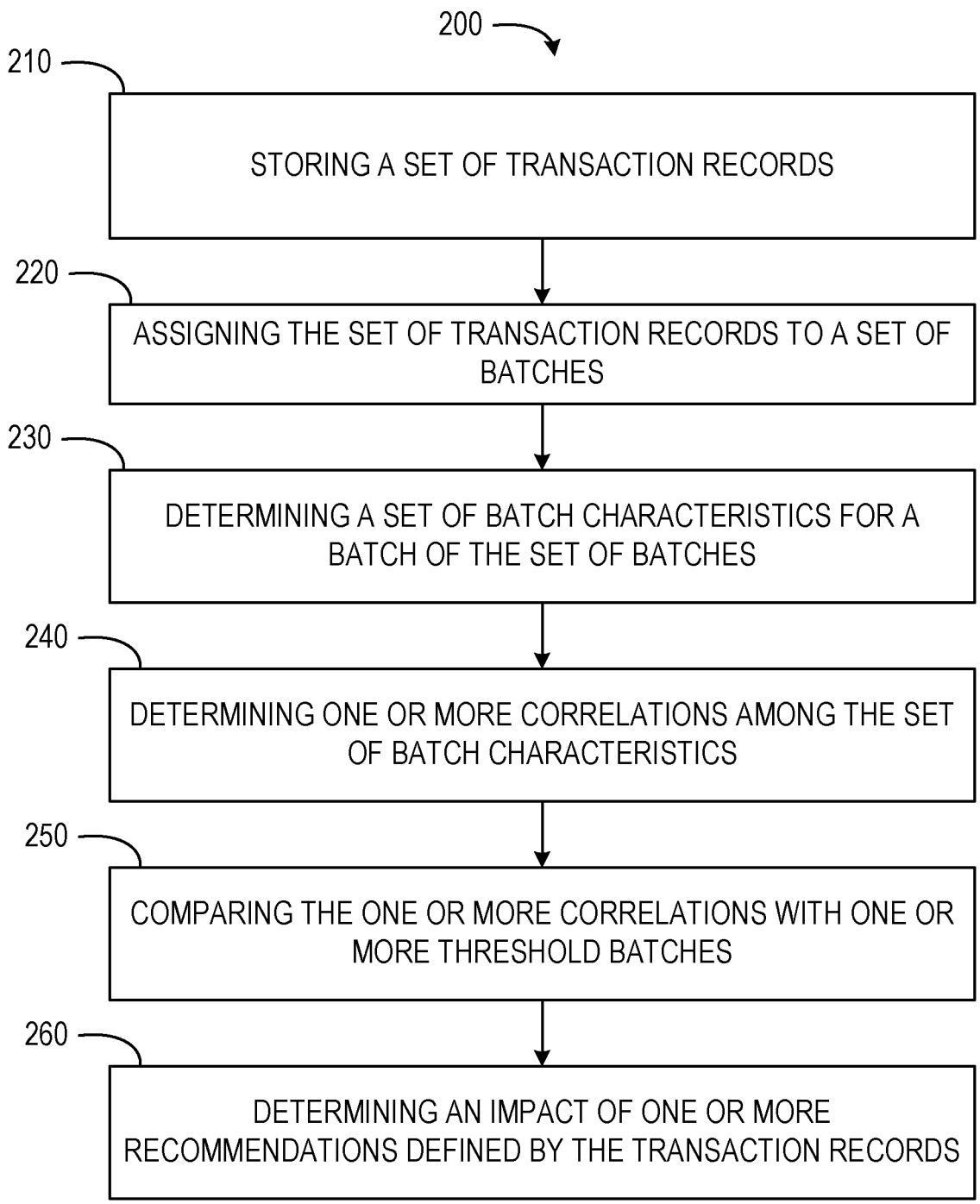
FIG. 2 depicts a flow diagram of a computer-implemented method for multi-dimensional record correlation, according to at least one embodiment.

Referring now to FIG. 2, a flow diagram of a computer-implemented method 200 is shown. The computer-implemented method 200 is a method for multi-dimensional record correlation. In some embodiments, the computer-implemented method 200 may be performed by one or more components of the computing environment 100, as described in more detail below.

At operation 210, the transaction component 110 stores a set of transaction records. The transaction records are associated with an AI decision engine. In some embodiments, each transaction record has a set of record characteristics. The set of transaction records may be stored in a database, data structure, server, or other suitable data repository. Data stored within the data repository may include the set of transaction records, metrics, feedback data, training data, and any other suitable data quantifying recommendations, decisions, or operations generated by the AI decision engine. In some embodiments, the set of transaction records represent monitoring of the AI decision engine on a production environment. The metrics may be AI metrics, statistics, model drift, and any other suitable metrics describing operations of the AI decision engine. The record characteristics may include metrics, described above, statistical data for the records, metadata describing the transaction records and other suitable data. In some instances, the metadata includes time values, feature values describing subjects of the transaction records, and other suitable data. The data repository may also receive and store other metrics, input, and data. In some embodiments, the transaction component 110 stores business metrics, business analytic data, and key performance indicators.

At operation 220, the batch component 120 assigns the set of transaction records to a set of batches. The set of transaction records are assigned to the set of batches, at least in part, based on the set of record characteristics. In some embodiments, the set of batches are predefined batches. The predefined batches may be understood as groupings or clusters for analysis of transaction records. In some instances, batches may be defined as groupings of transaction records with common transaction record categories, transaction record features, combinations of features, characteristics, combinations of characteristics, combinations thereof, or any other suitable grouping. The predefined batches may be associated with selectable user interface elements, such that a user may designate predefined batches by which to analyze transaction records. For example, predefined batches may group transaction records and be selectable based on time, time duration, feature values (e.g., male, female, age, etc.), combinations thereof, or any other suitable aspects associated with transaction records.

At operation 230, the determination component 130 determines a set of batch characteristics for a batch of the set of batches. In some embodiments, the determination component 130 applies principal component analysis to the record characteristics for the set of records assigned to the batch. The principal component analysis may select principal components for the batch from the record characteristics. The principal components may be understood as a subset of record characteristics (e.g., variables) which are linearly uncorrelated. Each record characteristics within the subset of record characteristics is selected as a principal component based on an amount of variance the record characteristic has on one or more of the record transactions assigned to the batch. In some embodiments, the determination component 130 determines the set of batch characteristics from the set of record characteristics using one or more clustering or grouping algorithms. The determination component 130 may use machine learning clustering operations or any other suitable clustering operations or algorithms.

In some embodiments, the determination component 130 determines a set of record metrics for transaction records assigned to the batch. The determination component 130 merges the set of record metrics with a predetermined set of batch features for the batch to generate the set of batch characteristics. In such embodiments, the determination component 130 transposes one or more record metrics or record characteristics onto the set of batch features. Transposition of the record metrics or record characteristics enables record metrics or record characteristics to share dimensionality with suitable or matching batch features. Once the determination component 130 merges the set of record metrics or record characteristics with the set of batch features, generating a first set of batch characteristics, the determination component 130 may determine the set of batch characteristics of operation 230 by applying principal component analysis or other grouping or clustering operations to determine a relative importance or effect of each batch characteristic of the first set of batch characteristics. Batch characteristics determined to have a relative importance or effect above a specified threshold may be selected for inclusion in the set of batch characteristics.

At operation 240, the correlation component 140 determines one or more correlations among the set of batch characteristics. In some embodiments, the correlation component 140 determines correlations within the batch. The correlation component 140 determines the one or more correlations by grouping the set of batch characteristics for the batch to identify a subset of batch characteristics. The subset of batch characteristics may be determined or selected as batch characteristics having an effect on transaction records of the AI decision engine. In some embodiments, the effect of one or more batch characteristics is determined to be above an effect threshold. In some embodiments, the correlation component 140 determines the one or more correlations by performing principal component analysis on the set of batch characteristics. The correlation component 140 determines which of the batch characteristics are principal components of the batch to select the subset of batch characteristics.

In some embodiments, the correlation component 140 determines correlations between batches of the set of batches. In such instances, the correlation component 140 may determine principal components (e.g., subsets of batch characteristics) for each batch. The correlation component 140 may then determine correlations between principal components of each batch. In some embodiments, the correlation component 140 determines correlations between principal components of a specified batch and principal components of a reference batch. The reference batch may be a reference batch associated with the specified batch. For example, a reference batch may be a previously generated and analyzed batch which was populated with transaction records similar to the transaction records of the specified batch. The correlation component 140 may calculate correlations between the principal components of the specified batch and estimated or predicted principal components of the reference batch.

In some embodiments, the correlation component 140 determines correlations between records and metrics (e.g., business metrics or AI metrics). In such embodiments, the correlation component 140 transposes data for a specified batch and determines first principal components for the specified batch. The correlation component 140 merges metrics and the first principal components for the specified batch. The correlation component 140 may then calculate second principal components on the merged data and determined correlations for the second principal components. The correlations for the second principal components may be determined within the specified batch, based on a reference batch, or with other batches, as discussed in more detail above.

At operation 250, the comparison component 150 compares the one or more correlations with one or more threshold batches. The one or more threshold batches may be reference batches, model batches, predetermined batches, combinations thereof, or any other suitable batches. The threshold batches, or correlations thereof, are batches with known, modeled, or estimated correlations determined for batch characteristics, metrics, or record transaction characteristics associated with the threshold batch. The comparison component 150 may compare the one or more correlations to threshold correlations of the threshold batches.

At operation 260, the impact component 160 determines an impact of one or more recommendations of the AI decision engine. The one or more recommendations are defined by or recorded as at least a portion of the set of transaction records. In some embodiments, the impact is determined from the one or more correlations and the comparison of the correlations and the threshold batches. The impact component 160 may determine an impact of the one or more recommendations as being significant, where at least one of the correlations associated with a transaction record representing the recommendation has a value equal to or greater than a comparable threshold correlation of the threshold batch. In some embodiments, determining the impact of the one or more recommendation, by using associated correlations and threshold correlations, enables comparison of AI metrics to business payloads or business metrics, such as key performance indicator (KPI) metrics.

In some embodiments, the set of transaction records are assigned to a plurality of batches of the set of batches. Each batch of the plurality of batches has a set of batch characteristics. In some embodiments, features, metrics, or aspects of two or more sets of batch characteristics, among differing batches, overlap or partially overlap. In such instances, features or metrics may be included as batch characteristics of more than one batch of the set of batches. Similar to the manner described above, the determination component 130 clusters the set of batch characteristics of each batch of the plurality of batches. The determination component 130 generates a plurality of subsets of batch characteristics. Each batch may correspond to a distinct subset of batch characteristics of the plurality of subsets of batch characteristics. The correlation component 140 may then determine the one or more correlations among the plurality of subsets of batch characteristics. In some embodiments, the correlation component 140 determines correlations within individual batches and subsets of batch characteristics. The correlation component 140, in some instances, determines correlations across or among batches and subsets of batch characteristics.

Figure 3:
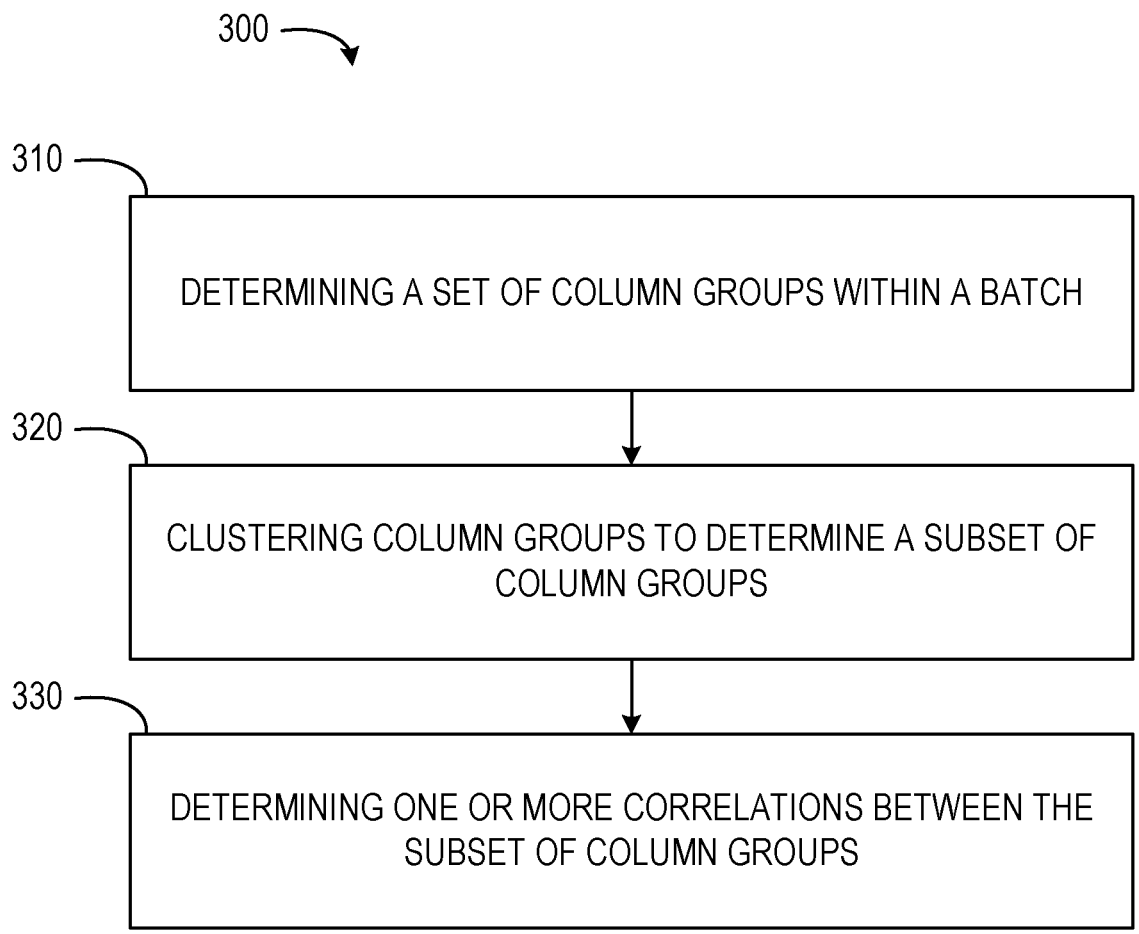
FIG. 3 depicts a flow diagram of a computer-implemented method for multi-dimensional record correlation, according to at least one embodiment.

FIG. 3 shows a flow diagram of an embodiment of a computer-implemented method 300 for multi-dimensional record correlation. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the batch component 120 determines a set of column groups within the batch. The column groups include columns having similar data. In some embodiments, the column groups include columns containing features, model outcomes, business payload data, and metrics. The metrics may include AI metrics such as accuracy and model drift. The metrics may also include business metrics such as KPI data. The batch component 120 may determine a column group as a set of columns populated by similar data (e.g., three columns containing feature data).

In some embodiments, the batch component 120 determines the set of column groups by initially merging data types for columns. The batch component 120 may determine dimensionality for the entries within a specified column. Where a portion of the entries have a dimensionality differing from another portion of the entries, or entries in another column, the batch component 120 modifies the portion of the entries to match dimensionality of the other entries in the column or in another column. For example, the batch component 120 may modify dimensionality of single dimensional entries to match a dimensionality of an entry describing a greatest amount of variance in a data set. The batch component 120 may modify the portion of the entries by reducing dimensionality of the portion of entries to match a dimensionality of other entries within the column or the other column. In some embodiments, the batch component 120 modifies dimensionality of one or more entries outside of the portion of entries. The batch component 120 matches dimensionality among column entries to enforce compatibility between AI metrics and other components of the transaction records, such as business data. Once entries of the columns are compatible, the batch component determines the set of column groups.

In operation 320, the batch component 120 clusters the column groups to determine a subset of column groups. In some embodiments, the batch component 120 cluster the column groups using principal component analysis to determine a portion of the columns for each column group. The portion of the columns may represent principal components of a specified column group. In some embodiments, the batch component 120 clusters the column groups to determine which column groups are principal components among the set of column groups.

In operation 330, the batch component 120 determines one or more correlations between the subset of column groups. In some embodiments, correlations among column groups are determined as correlations within a batch. The batch component 120 may determine the one or more correlations as described above with respect to the method 200. The batch component 120 may determine correlations using principal component analysis or any other suitable grouping, clustering, or correlation methodology.

Figure 4:
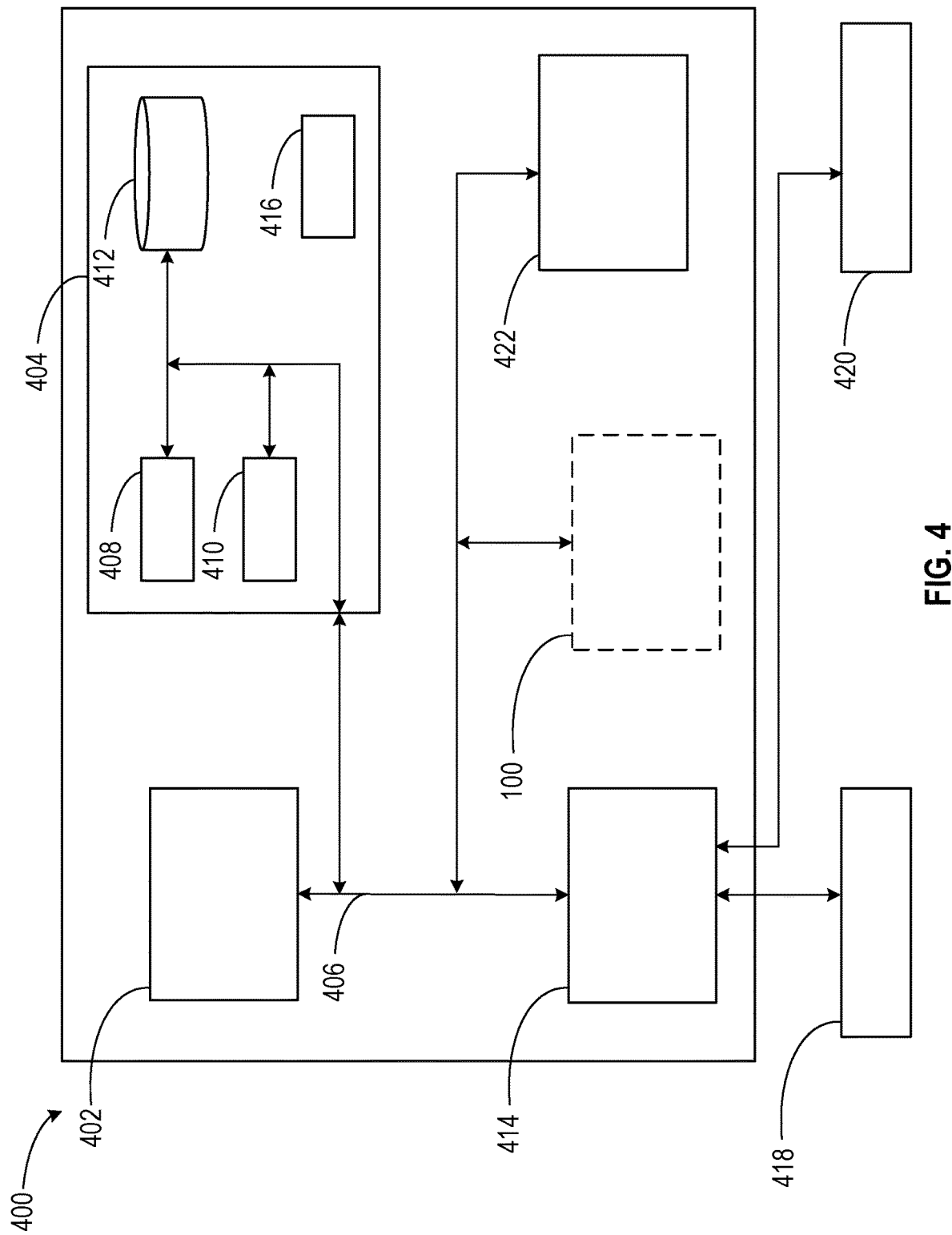
FIG. 4 depicts a block diagram of a computing system for multi-dimensional record correlation, according to at least one embodiment.

Embodiments of the present disclosure may be implemented together with virtually any type of computer, regardless of the platform being suitable for storing and/or executing program code. FIG. 4 shows, as an example, a computing system 400 (e.g., cloud computing system) suitable for executing program code related to the methods disclosed herein and for multi-dimensional record correlation.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the transaction component 110, the batch component 120, the determination component 130, the correlation component 140, the comparison component 150, and the impact component 160, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
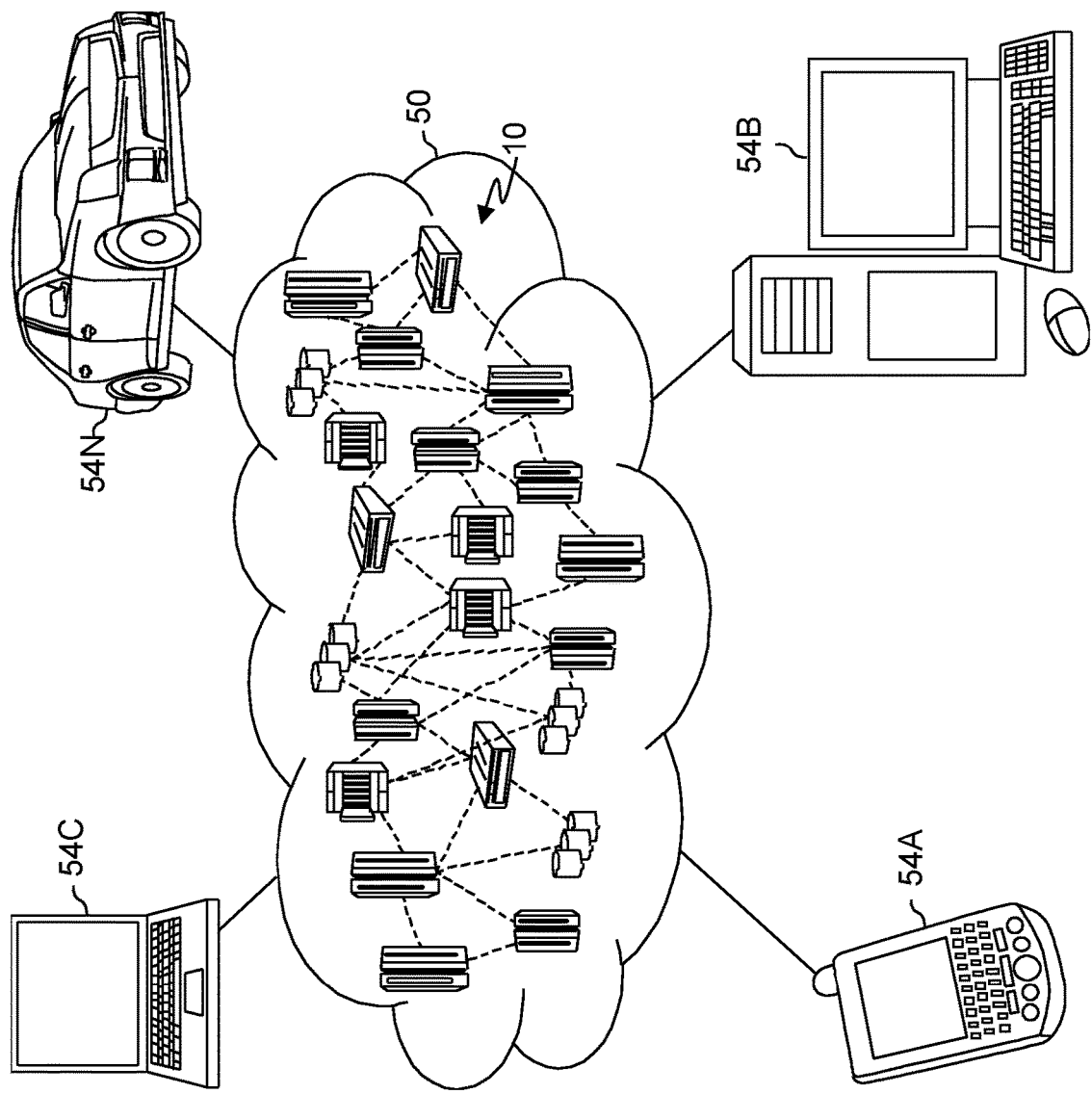
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
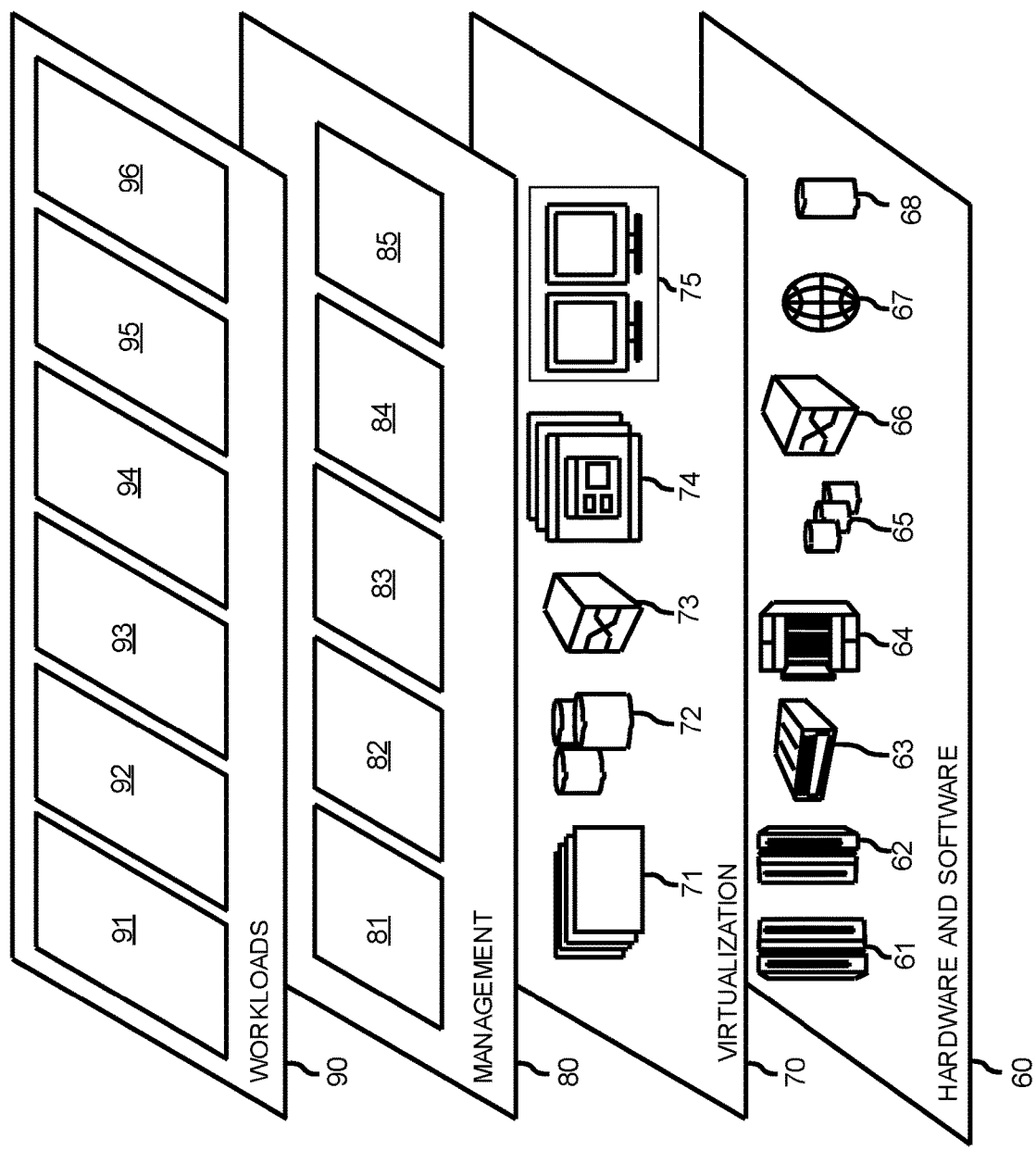
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network traffic direction processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
  assigning a set of transaction records, defining one or more recommendations made by an artificial intelligence (AI) decision engine, to a set of batches based on a set of record characteristics for the set of transaction records;
  determining a set of batch characteristics for a batch of the set of batches;
  determining one or more correlations among the set of batch characteristics;
  comparing the one or more correlations with threshold correlations of one or more threshold batches; and
  determining, from the one or more correlations and the comparing, an impact of one or more recommendations of the AI decision engine.

2. The method of claim 1, wherein determining the set of batch characteristics further comprises:
  determining a set of record metrics for transaction records assigned to the batch; and
  merging the set of record metrics with a predetermined set of batch features for the batch to generate the set of batch characteristics.

3. The method of claim 2, wherein determining the one or more correlations further comprises:

grouping the set of batch characteristics for the batch to identify a subset of batch characteristics having an effect on the transaction records above an effect threshold.

4. The method of claim 2, wherein determining the one or more correlations further comprises performing principal component analysis on the set of batch characteristics to determine a subset of batch characteristics among the set of batch characteristics.

5. The method of claim 1, further comprising:
determining a set of column groups within the batch; and
clustering the column groups to determine a subset of column groups.

6. The method of claim 5, wherein determining the one or more correlations among the set of batch characteristics further comprises:
determining one or more correlations between the subset of column groups.

7. The method of claim 1, wherein the set of transaction records are assigned to a plurality of batches of the set of batches and each batch of the plurality of batches has the set of batch characteristics, the method further comprising:
clustering the set of batch characteristics of each batch of the plurality of batches to generate a plurality of subsets of batch characteristics; and
determining the one or more correlations among the plurality of subsets of batch characteristics.

8. A system, comprising:
one or more processors; and
a computer-readable storage medium, coupled to the one or more processors, storing program instructions that, when executed by the one or more processors, cause the one or more processors to perform operations comprising:
assigning a set of transaction records, defining one or more recommendations made by an artificial intelligence (AI) decision engine, to a set of batches based on a set of record characteristics for the set of transaction records;
determining a set of batch characteristics for a batch of the set of batches;
determining one or more correlations among the set of batch characteristics;
comparing the one or more correlations with threshold correlations of one or more threshold batches; and
determining, from the one or more correlations and the comparing, an impact of one or more recommendations of the AI decision engine.

9. The system of claim 8, wherein determining the set of batch characteristics further comprises:
determining a set of record metrics for transaction records assigned to the batch; and
merging the set of record metrics with a predetermined set of batch features for the batch to generate the set of batch characteristics.

10. The system of claim 9, wherein determining the one or more correlations further comprises:
grouping the set of batch characteristics for the batch to identify a subset of batch characteristics having an effect on the transaction records above an effect threshold.

11. The system of claim 9, wherein determining the one or more correlations further comprises performing principal component analysis on the set of batch characteristics to determine a subset of batch characteristics among the set of batch characteristics.

12. The system of claim 8, wherein the operations further comprise:
determining a set of column groups within the batch; and
clustering the column groups to determine a subset of column groups.

13. The system of claim 12, wherein determining the one or more correlations among the set of batch characteristics further comprises:
determining one or more correlations between the subset of column groups.

14. The system of claim 8, wherein the set of transaction records are assigned to a plurality of batches of the set of batches and each batch of the plurality of batches has the set of batch characteristics, the operations further comprise:
clustering the set of batch characteristics of each batch of the plurality of batches to generate a plurality of subsets of batch characteristics; and
determining the one or more correlations among the plurality of subsets of batch characteristics.

15. A computer program product comprising a computer readable storage medium having program instructions embodied therewith, the program instructions being executable by one or more processors to cause the one or more processors to perform operations comprising:
providing one or more recommendations produced by an artificial intelligence (AI) decision engine;
storing a set of transaction records associated with the AI decision engine, each transaction record having a set of record characteristics, the set of transaction records defining the one or more recommendations;
assigning the set of transaction records to a set of batches based on the set of record characteristics;
determining a set of batch characteristics for a batch of the set of batches;
determining one or more correlations among the set of batch characteristics;
comparing the one or more correlations with threshold correlations of one or more threshold batches; and
determining, from the one or more correlations and the comparing, an impact of one or more recommendations of the AI decision engine.

16. The computer program product of claim 15, wherein determining the set of batch characteristics further comprises:
determining a set of record metrics for transaction records assigned to the batch; and
merging the set of record metrics with a predetermined set of batch features for the batch to generate the set of batch characteristics.

17. The computer program product of claim 16, wherein determining the one or more correlations further comprises:
grouping the set of batch characteristics for the batch to identify a subset of batch characteristics having an effect on the transaction records above an effect threshold.

18. The computer program product of claim 16, wherein determining the one or more correlations further comprises performing principal component analysis on the set of batch characteristics to determine a subset of batch characteristics among the set of batch characteristics.

19. The computer program product of claim 15, wherein the operations further comprise:
determining a set of column groups within the batch;
clustering the column groups to determine a subset of column groups; and determining the one or more correlations among the set of batch characteristics includes determining one or more correlations between the subset of column groups.

20. The computer program product of claim 15, wherein the set of transaction records are assigned to a plurality of batches of the set of batches and each batch of the plurality of batches has the set of batch characteristics, the operations further comprising:
    clustering the set of batch characteristics of each batch of the plurality of batches to generate a plurality of subsets of batch characteristics; and
    determining the one or more correlations among the plurality of subsets of batch characteristics.

\* \* \* \* \*